United States Patent
Tagawa et al.

(10) Patent No.: US 11,754,937 B1
(45) Date of Patent: Sep. 12, 2023

(54) ROLL MEMBER, CHARGING MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventors: Yuki Tagawa, Kanagawa (JP); Ryo Sekiguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/945,291

(22) Filed: Sep. 15, 2022

(30) Foreign Application Priority Data

Feb. 22, 2022 (JP) .................................. 2022-026157

(51) Int. Cl.
| | |
|---|---|
| *G03G 15/02* | (2006.01) |
| *B32B 27/08* | (2006.01) |
| *D01F 6/90* | (2006.01) |
| *G03G 15/16* | (2006.01) |
| *G03G 15/08* | (2006.01) |

(52) U.S. Cl.
CPC ......... *G03G 15/0233* (2013.01); *B32B 27/08* (2013.01); *D01F 6/90* (2013.01); *G03G 15/0818* (2013.01); *G03G 15/1685* (2013.01)

(58) Field of Classification Search
CPC .......... G03G 15/0233; G03G 15/1685; G03G 15/0818; B32B 27/08; D01F 6/90
See application file for complete search history.

(56) References Cited

U.S. PATENT DOCUMENTS

| 10,018,935 B2 | 7/2018 | Ishida et al. | |
| 2011/0052252 A1* | 3/2011 | Lin | G03G 15/0233 399/176 |

FOREIGN PATENT DOCUMENTS

| EP | 0723208 B1 * | 8/2002 | |
| JP | H06161229 A * | 6/1994 | |
| JP | H08137186 A * | 5/1996 | |
| JP | 2010-2766 A | 1/2010 | |
| JP | 2011013495 A * | 1/2011 | ......... G03G 15/0233 |
| JP | 2016-85395 A | 5/2016 | |
| JP | 2017181687 A * | 10/2017 | |
| JP | 2021-96377 A | 6/2021 | |

* cited by examiner

*Primary Examiner* — Ryan D Walsh
(74) *Attorney, Agent, or Firm* — Sughrue Mion, PLLC

(57) ABSTRACT

A roll member includes a conductive elastic layer, and a surface layer provided on the conductive elastic layer. The surface layer contains a crosslinked product of crosslinkable nylon, the crosslinking degree of the surface layer specified by formula (1) below is 0.3 or more and 0.7 or less, and the thermal degradation index of the surface layer specified by formula (2) below is 2.1 or more and 2.3 or less.

Crosslinking degree=absorbance at 1078 cm$^{-1}$÷absorbance at 2935 cm$^{-1}$    Formula (1):

Thermal degradation index=absorbance at 1638 cm$^{-1}$÷absorbance at 1543 cm$^{-1}$    Formula (2):

12 Claims, 3 Drawing Sheets

ROLL MEMBER, CHARGING MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-026157 filed Feb. 22, 2022.

BACKGROUND

(i) Technical Field

The present disclosure relates to a roll member, a charging member, a charging device, a process cartridge, and an image forming apparatus.

(ii) Related Art

Japanese Unexamined Patent Application Publication No. 2010-002766 proposes a charging member which charges the surface of an image holding member provided in an image forming apparatus and which includes a substrate and an outermost surface layer provided on the substrate and being in contact with the image holding member. The outermost surface layer contains a polyamide resin crosslinked with at least one of an epoxy resin and an isocyanate resin, and the crosslinking degree is 30% or more.

Japanese Unexamined Patent Application Publication No. 2016-085395 proposes a conductive member for an electrophotographic device, the member including a conductive rubber elastic layer containing crosslinked rubber and an ion conductive agent, and a surface layer formed on the outer periphery of the conductive rubber elastic layer, the surface layer containing a polymer and polyphenol.

Japanese Unexamined Patent Application Publication No. 2021-096377 proposes a conductive roll for an electrophotographic device, including a shaft body, an elastic layer formed on the outer peripheral surface of the shaft body, and a surface layer formed on the outer peripheral surface of the elastic layer. At least one of the elastic layer and the surface layer contains a component containing halogen atom, at least one of the elastic layer and the surface layer contains a polymer having a $NH_2$ group, and at least one of the elastic layer and the surface layer contains an ion exchanger containing at least one of zirconium and bismuth as a metal component.

SUMMARY

Aspects of non-limiting embodiments of the present disclosure relate to a roll member including a conductive elastic layer and a surface layer provided on the conductive elastic layer, the surface layer containing a crosslinked product of crosslinkable nylon, and when the roll member is continuously rotated in a state of being pressed against another body, the occurrence of a crack in the surface layer is suppressed as compared with when the crosslinking degree of the surface layer specified by formula (1) below is less than 0.3 or exceeds 0.7 or when the thermal degradation index of the surface layer specified by formula (2) below is less than 2.1 or exceeds 2.3.

Crosslinking degree=absorbance at 1078 $cm^{-1}$÷absorbance at 2935 $cm^{-1}$  Formula (1):

Thermal degradation index=absorbance at 1638 $cm^{-1}$÷absorbance at 1543 $cm^{-1}$  Formula (2):

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a roll member including a conductive elastic layer and a surface layer provided on the conductive elastic layer, wherein: the surface layer contains a crosslinked product of crosslinkable nylon; the crosslinking degree of the surface layer specified by formula (1) below is 0.3 or more and 0.7 or less; and the thermal degradation index of the surface layer specified by formula (2) below is 2.1 or more and 2.3 or less.

Crosslinking degree=absorbance at 1078 $cm^{-1}$÷absorbance at 2935 $cm^{-1}$  Formula (1):

Thermal degradation index=absorbance at 1638 $cm^{-1}$÷absorbance at 1543 $cm^{-1}$  Formula (2):

BRIEF DESCRIPTION OF THE DRAWINGS

Exemplary embodiments of the present disclosure will be described in detail based on the following figures, wherein.

DETAILED DESCRIPTION

Figure 1:
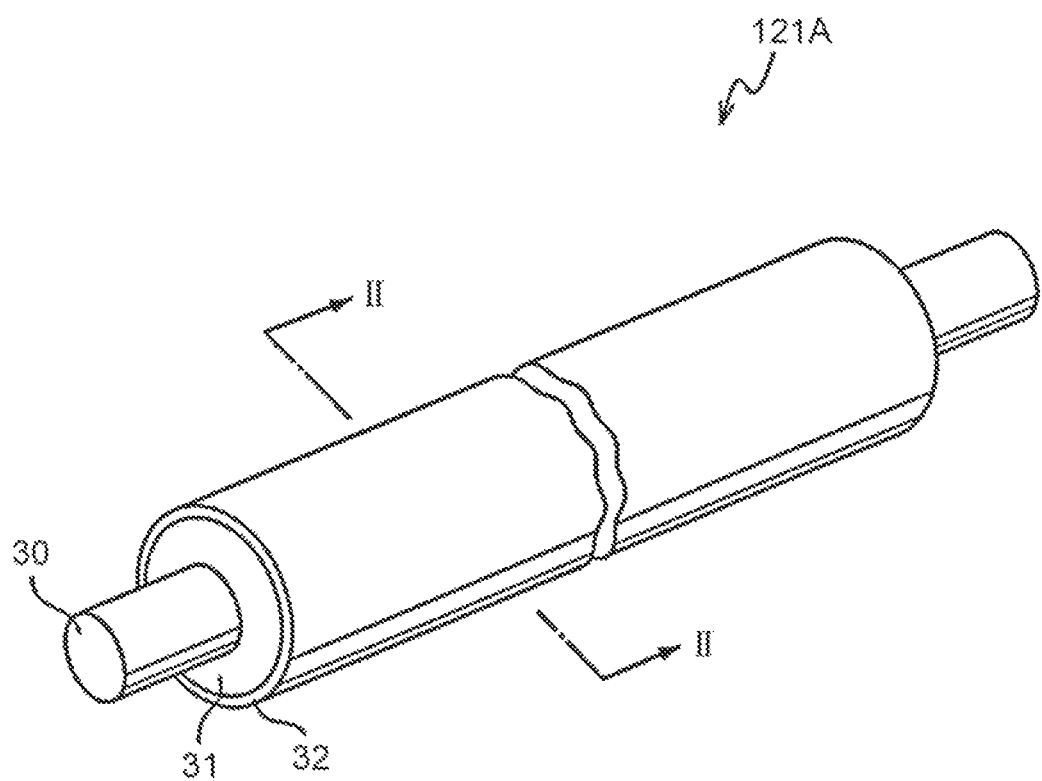
FIG. 1 is a schematic perspective view showing an example of a roll member according to an exemplary embodiment of the present disclosure.

An exemplary embodiment of the present disclosure is described below. The description and examples illustrate the present disclosure, and the present disclosure is not limited to these.

In the numerical ranges stepwisely described in the present specification, the upper limit value or the lower limit value described in one of the numerical ranges may be replaced by the upper limit value or the lower limit value in another numerical range stepwisely described. In addition, in a numerical range described in the present specification, the upper limit value or the lower limit value of the numerical range may be replaced by the value described in an example.

In addition, each component in a composition may contain plural materials corresponding to the component.

In description of the amount of each of the components in a composition, when plural materials corresponding to each of the components are present in a composition, the amount of each of the components represents the total amount of the plural materials present in the composition unless otherwise specified.

<Roll Member>

A roll member according to an exemplary embodiment of the present disclosure includes a conductive elastic layer and a surface layer provided on the conductive elastic layer. The surface layer contains a crosslinked product of crosslinkable nylon, the crosslinking degree of the surface layer specified by formula (1) below is 0.3 or more and 0.7 or less, and the thermal degradation index of the surface layer specified by formula (2) below is 2.1 or more and 2.3 or less.

Crosslinking degree=absorbance at 1078 cm$^{-1}$÷absorbance at 2935 cm$^{-1}$     Formula (1):

Thermal degradation index=absorbance at 1638 cm$^{-1}$÷absorbance at 1543 cm$^{-1}$     Formula (2):

The roll member according to the exemplary embodiment has the configuration described above and thus suppresses the occurrence of a crack in the surface layer when continuously rotated in a state of being pressed against another body. The reason for this is supposed as follows.

When a roll member including a conductive elastic layer and a surface layer provided on the conductive elastic layer, the surface layer containing a crosslinked product of crosslinkable nylon, is continuously rotated in a state of being pressed against another body, crack may occur in the surface layer. When a roll member is continuously rotated in a state of being pressed against another body, the repeated application of force to a surface layer may cause fatigue of the surface layer, thereby cracking the surface layer.

As a result of earnest investigation, it is found that the control of the crosslinked state of the crosslinkable nylon of the surface layer is effective for suppressing the occurrence of a crack in the surface layer.

In producing the crosslinked product of crosslinkable nylon, crosslinking reaction of a crosslinkable functional group (that is, a functional group which causes crosslinking reaction with an amide group contained in the crosslinkable nylon) contained in the crosslinkable nylon may proceed simultaneously with decomposition reaction of the amide group contained in the crosslinkable nylon. In order to suppress the occurrence of a crack in the surface layer, specifically, it is effective for producing the crosslinked product of the crosslinkable nylon to suppress the decomposition reaction of the amide group and accelerate the crosslinking reaction of the crosslinkable functional group.

In the roll member according to the exemplary embodiment, the crosslinking degree of the surface layer specified by the formula (1) is 0.3 or more and 0.7 or less. In the formula (1), absorbance at 1078 cm$^{-1}$ represents the absorbance derived from a crosslinkable functional group (for example, a methoxymethyl group) before causing the crosslinking reaction. Also, in the formula (1), absorbance at 2935 cm$^{-1}$ represents the absorbance derived from a methylene group not contributing to the crosslinking reaction. When the crosslinking degree of the surface layer specified by the formula (1) is 0.7 or less, elimination reaction of a crosslinkable functional group (for example, a methoxymethyl group) proceeds in the crosslinked product of the crosslinkable nylon. Therefore, the resultant surface layer contains the crosslinked product of crosslinkable nylon, which is produced by acceleration of crosslinking reaction of the crosslinkable functional group. Also, when the crosslinking degree of the surface layer specified by the formula (1) is 0.3 or more, thermal degradation reaction proceeding simultaneously with crosslinking of the surface layer can be suppressed.

On the other hand, in the roll member according to the exemplary embodiment, the thermal degradation index of the surface layer specified by the formula (2) is 2.1 or more and 2.3 or less. In the formula (2), absorbance at 1638 cm$^{-1}$ represents the absorbance derived from C=O of an amide group. Also, in the formula (2), absorbance at 1543 cm$^{-1}$ represents the absorbance derived from N—H of an amide group. When the thermal degradation index of the surface layer specified by the formula (2) is 2.3 or less, a crosslinked structure is formed. Therefore, the resultant surface layer contains the crosslinked product of the crosslinkable nylon, which is produced by suppressing decomposition reaction of an amide group. When the thermal degradation index of the surface layer specified by the formula (2) is 2.1 or more, the crosslinked structure formed by elimination of a crosslinkable functional group (for example, a methoxymethyl group) in the surface layer can be suppressed from being decomposed by thermal degradation.

Thus, it is supposed that when the roll member according to the exemplary embodiment is continuously rotated in a state of being pressed against another body, the occurrence of a crack in the surface layer is suppressed.

The surface layer of the roll member according to the exemplary embodiment preferably contains a sulfonic acid-based compound.

The roll member according to the exemplary embodiment having the configuration described above more suppresses the occurrence of a crack in the surface layer when continuously rotated in a state of being pressed against another body. The reason for this is supposed as follows.

The sulfonic acid-based compound functions as a catalyst of the crosslinking reaction of the crosslinkable functional group contained in crosslinkable nylon. When the crosslinked product of crosslinkable nylon is produced in the presence of the sulfonic acid-based compound, crosslinking reaction of the crosslinkable functional group is accelerated, and decomposition reaction of an amide group is easily suppressed.

Therefore, the surface layer containing the crosslinked product of crosslinkable nylon and the sulfonic acid-based compound easily becomes a surface layer containing the crosslinked product of crosslinkable nylon, which is produced by accelerating crosslinking reaction of the crosslinkable functional group and suppressing decomposition reaction of the amide group.

Thus, it is supposed that when the roll member according to the exemplary embodiment is continuously rotated in a state of being pressed against another body, the occurrence of a crack in the surface layer is more suppressed.

When in forming the surface layer, the sulfonic acid-based compound is used as the catalyst of crosslinking reaction of the crosslinkable functional group contained in the crosslinkable nylon, the roll member according to the exemplary embodiment is easily produced.

(Conductive Elastic Layer)

—Composition, Film Thickness, and Volume Resistivity of Conductive Elastic Layer—

The conductive elastic layer contains, for example, an elastic material, a conductive agent, and other additives.

Examples of the elastic material include isoprene rubber, chloroprene rubber, epichlorohydrin rubber, butyl rubber, polyurethane, silicone rubber, fluorine rubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and blend rubber of these. Among these, preferred are polyurethane, silicone rubber, EPDM, epichlorohydrin-ethylene oxide copolymer rubber, epichlorohydrin-ethylene oxide-ally glycidyl ether copolymer rubber, NBR, and blend rubber of these. These elastic materials may be either foamed materials or unfoamed materials.

Examples of the conductive agent include an electronic conductive agent and an ionic conductive agent. Examples of the electronic conductive agent include powders of carbon black such as ketjen black, acetylene black, and the like; pyrolytic carbon; graphite; conductive metals or alloys such as aluminum, copper, nickel, stainless steel, and the like; conductive metal oxides such as tin oxide, indium oxide, titanium oxide, tin oxide-antimony oxide solid solution, tin oxide-indium oxide solid solution, and the like; an insulating material with a conductive-treated surface; and the like. Examples of the ionic conductive agent include perchlorates or chlorates of oniums such as tetraethyl ammonium, lauryl trimethyl ammonium, and the like; perchlorates or chlorates of alkali metals or alkaline-earth metals such as lithium, magnesium, and the like; and the like. These conductive agents may be used alone or in combination of two or more.

Examples of carbon black include "Special Black 350", "Special Black 100", "Special Black 250", "Special Black 5", "Special Black 4", "Special Black 4A", "Special Black 550", "Special Black 6", "Carbon Black FW200", "Carbon Black FW2", and "Carbon black FW2V", which are manufactured by Orion Engineered Carbons Inc., "MONARCH 880", "MONARCH 1000", "MONARCH 1300", "MONARCH 1400", "MOGUL-L", and "REGAL 400R", which are manufactured by Cabot Corporation, and the like.

The amount of the conductive agent mixed is not particularly limited, but the amount of the electronic conductive agent relative to 100 parts by mass of the elastic material is preferably within a range of 1 part by mass or more and 30 parts by mass or less and more preferably within a range of 15 parts by mass or more and 25 parts by mass or less. The amount of the ionic conductive agent relative to 100 parts by mass of the elastic material is preferably within a range of 0.1 parts by mass or more and 5.0 parts by mass or less and more preferably within a range of 0.5 parts by mass or more and 3.0 parts by mass or less.

Examples of other additives mixed in the conductive elastic layer include general materials which can be mixed in the conductive elastic layer, such as a softening agent, a plasticizer, a curing agent, a vulcanizing agent, a vulcanization accelerator, an antioxidant, a surfactant, a coupling agent, a filler (silica, calcium carbonate, or the like), and the like.

The layer thickness, on average, of the conductive elastic layer is preferably about 1 mm or more and 15 mm or less and more preferably about 2 mm or more and 10 mm or less.

The volume resistivity of the conductive elastic layer is preferably $10^3$ Ωcm or more $10^{14}$ Ωcm or less.

—Method for Forming Conductive Elastic Layer—

Examples of a method for forming the conductive elastic layer include a method in which an elastic layer-forming composition prepared by mixing the elastic material, the conductive agent, and other additives and a cylindrical conductive substrate are extruded together from an extrusion molding machine to form a layer of the elastic layer-forming composition on the outer peripheral surface of the conductive substrate, and then the layer of the elastic layer-forming composition is heated to effect crosslinking reaction, forming an elastic layer; a method in which an elastic layer-forming composition prepared by mixing the elastic material, the conductive agent, and other additives is extruded on the outer peripheral surface of an endless belt-shaped conductive substrate from an extrusion molding machine to form a layer of the elastic layer-forming composition on the outer peripheral surface of the conductive substrate, and then the layer of the elastic layer-forming composition is heated to effect crosslinking reaction, forming an elastic layer; and the like.

(Surface Layer)

—Composition of Surface Layer—

The surface layer contains the crosslinked product of crosslinkable nylon.

The crosslinked product of crosslinkable nylon is a crosslinked product produced by crosslinking a crosslinkable functional group contained in crosslinkable nylon with an amide group contained in crosslinkable nylon.

The crosslinkable nylon is nylon having a crosslinkable functional group.

The crosslinkable functional group is not particularly limited as long as it is a functional group which causes crosslinking reaction with an amide group contained in the crosslinkable nylon.

The crosslinkable functional group is, for example, an alkoxyalkyl group.

From the viewpoint of more suppressing the occurrence of a crack in the surface layer when continuously rotated in a state of being pressed against another body, the crosslinkable functional group is preferably an alkoxyalkyl group.

The alkoxyalkyl group is a group represented by —$R^1$—$OR^2$.

$R^1$ is an alkylene group, and $R^2$ is an alkyl group.

The "alkylene group" is a group represented by —$(C_nH_{2n})$—.

$R^1$ is preferably an alkylene group having 1 or more and 30 or less carbon atoms, more preferably an alkylene group having 1 or more and 15 or less carbon atoms, still more preferably an alkylene group having 1 or more and 8 or less carbon atoms, particularly preferably an alkylene group having 1 or more and 3 or less carbon atoms, and most preferably an alkylene group (methylene group) having 1 carbon atom.

$R^2$ is preferably an alkyl group having 1 or more and 30 or less carbon atoms, more preferably an alkyl group having 1 or more and 15 or less carbon atoms, still more preferably an alkyl group having 1 or more and 8 or less carbon atoms, particularly preferably an alkyl group having 1 or more and 3 or less carbon atoms, and most preferably an alkyl group (methyl group) having 1 carbon atom.

That is, the alkoxymethyl group is most preferably a methoxymethyl group.

The crosslinkable functional group is preferably a methoxymethyl group.

That is, the crosslinkable nylon is methoxymethylated nylon.

The methoxymethylated nylon represents a compound in which hydrogen atoms of at least some of the amide groups contained in nylon are substituted by methoxymethyl groups.

Using the methoxymethylated nylon as the crosslinkable nylon facilitates the production of a roll member which more suppresses the occurrence of a crack in the surface layer when continuously rotated in a state of being pressed against another body. The reason for this is supposed as follows.

The methoxymethyl group has excellent crosslinking reactivity with an amide group. Thus, crosslinking reaction of the crosslinkable functional group is easily accelerated.

It is thus supposed that using the methoxymethylated nylon as the crosslinkable nylon facilitates the production of a roll member which more suppresses the occurrence of a crack in the surface layer when continuously rotated in a state of being pressed against another body.

From the viewpoint of producing the roll member which more suppresses the occurrence of a crack in the surface layer when continuously rotated in a state of being pressed against another body, the weight-average molecular weight of the methoxymethylated nylon is preferably 10,000 or more and 100,000 or less, more preferably 15,000 or more and 50,000 or less, and still more preferably 20,000 or more and 40,000 or less.

The weight-average molecular weight of the methoxymethylated nylon is a value measured by a gel permeation chromatography (GPC) method under measurement conditions below.

Column: product name: KF-404 (manufactured by Shodex Corporation)
Column temperature: 25° C.
Eluent: HFIP
Flow rate: 0.5 mL/min
Detector: RI (differential diffractive index detector)

From the viewpoint of producing the roll member which more suppresses the occurrence of a crack in the surface layer when continuously rotated in a state of being pressed against another body, the methoxymethylation rate of the methoxymethylated nylon is preferably 15% or more and 50% or less, more preferably 20% or more and 45% or less, and still more preferably 25% or more and 40% or less.

The methoxymethylation rate represents the degree in which hydrogen atoms of amide groups contained in the nylon are substituted with methoxymethyl groups during methoxymethylation of the nylon.

The methoxymethylation rate of the methoxymethylated nylon can be measured by H-NMR measurement.

A measurement sample is prepared as described below and subjected to $^1$H-NMR measurement by a NMR apparatus (for example, trade name JNM-AL400 manufactured by JEOL Ltd. can be used). In the resultant NMR chart, calculated are an integrated value (also referred to as "A" hereinafter) of methylene protons (ca. 2.4 ppm) adjacent to the carbonyl moieties of methoxymethylated amide groups and an integrated value (also referred to as "B" hereinafter) of methylene protons (ca. 2.2 ppm) adjacent to the carbonyl moieties of amide groups not methoxymethylated. The methoxymethylation rate is calculated by formula (1) below using the calculated integrated values A and B.

Measurement sample
Methoxymethylated nylon: 2.0 mg
Methanol-D4 (99.8 atom % D) manufactured by Aldrich Co., Ltd.: 0.4 ml
Tetramethylsilane (internal standard material): 0.05% by mass relative to methanol-D4

Methoxymethylation rate (%)=$A/(A+B)\times 100$     Formula (1):

The content of the crosslinked product of crosslinkable nylon relative to the mass of the whole of the surface layer is preferably 40% by mass or more, more preferably 60% by mass or more, and still more preferably 70% by mass or more.

The surface layer may contain a binder resin other than the crosslinked product of crosslinkable nylon.

Examples of the binder resin include a urethane resin, polyester, phenol, acryl, polyurethane, an epoxy resin, cellulose, and the like.

The sulfonic acid-based compound in the surface layer of the roll member according to the exemplary embodiment is an arbitrary component, but the sulfonic aid-based compound is preferably contained.

Herein, the sulfonic acid-based compound represents a compound having at least one group selected from the group including a sulfo group (—SO$_3$H) and an anion (—SO$_3$—) formed by removing proton from a sulfo group.

The surface layer containing the sulfonic acid-based compound facilitates the production of the roll member which more suppresses the occurrence of a crack in the surface layer when continuously rotated in a state of being pressed against another body. The reason for this is as follows.

The sulfonic acid-based compound functions as a catalyst of crosslinking reaction of the crosslinkable functional group contained in the crosslinkable nylon. When the crosslinked product of the crosslinkable nylon is produced in the presence of the sulfonic acid-based compound, crosslinking reaction of the crosslinkable functional group is accelerated, and decomposition reaction of amide group is easily suppressed.

Therefore, the surface layer containing the crosslinked product of the crosslinkable nylon and the sulfonic acid-based compound easily becomes a surface layer containing the crosslinked product of the crosslinkable nylon, which is produced by accelerating crosslinking reaction of the crosslinkable functional group and suppressing decomposition reaction of amide group.

From the above, it is supposed that the resultant roll member more suppresses the occurrence of a crack in the surface layer when continuously rotated in a state of being pressed against another body.

Examples of the sulfonic acid-based compound include an aromatic sulfonic acid-based compound and a nonaromatic sulfonic acid-based compound.

The aromatic sulfonic acid-based compound is a sulfonic acid-based compound containing an aromatic ring.

While, the nonaromatic sulfonic acid-based compound is a compound not having an aromatic ring.

The aromatic sulfonic acid-based compound preferably has an aromatic ring and an aliphatic hydrocarbon group.

Examples of the aromatic ring include a benzene ring, a naphthalene ring, an anthracene ring, and the like. Among these, a benzene ring or a naphthalene ring is preferred as the aromatic ring.

The number of carbons in the aliphatic hydrocarbon group is preferably 1 or more and 20 or less, more preferably 1 or more and 15 or less, and still more preferably 1 or more and 13 or less.

The aliphatic hydrocarbon group is preferably at least one selected from the group including a saturated aliphatic hydrocarbon group and an unsaturated aliphatic hydrocarbon group, and a saturated aliphatic hydrocarbon group is preferred.

Examples of the aromatic sulfonic acid-based compound include benzenesulfonic acid, dodecylbenzenesulfonic acid, paratoluenesulfonic acid, 4-ethylbenzenesulfonic acid, p-chlorobenzenesulfonic acid, m-xylene-4-sulfonic acid, 3-pydridinesulfonic acid, dinonylnaphthalenesulfonic acid, dinonylnaphthalenedisulfonic acid, and 1-pyrenesulfonic acid; salts thereof; and the like.

Examples of the nonaromatic sulfonic acid-based compound include sulfuric acid, fluorosulfonic acid, methanesulfonic acid, ethanesulfonic acid, and 1-propanesulfonic acid; salts thereof; and the like.

The sulfonic acid-based compound is preferably at least one selected from the group including paratoluenesulfonic acid, paratoluenesulfonate salts, dinonylnaphthalenedisulfonic acid, dinonylnaphthalenedisulfonate salts, dodecylbenzenesulfonic acid, and dodecylbenzenesulfonate salts.

Examples of paratoluenesulfonate salts include paratoluenesulfonic acid amine salt, paratoluenesulfonic acid alkali metal salts, and the like.

Examples of dinonylnaphthalenedisulfonate salts include dinonylnaphthalenedisulfonic acid amine salt, dinonylnaphthalenedisulfonic acid alkali metal salts, and the like.

Examples of dodecylbenzenesulfonate salts include dodecylbenzenesulfonic acid amine salt, dodecylbenzenesulfonic acid alkali metal salts, and the like.

Using the compound described above as the sulfonic acid-based compound facilitates the production of the roll member which more suppresses the occurrence of a crack in the surface layer when continuously rotated in a state of being pressed against another body. The reason for this is as follows.

The paratoluenesulfonic acid, dinonylnaphthalenedisulfonic acid, and dodecylbenzenesulfonic acid are excellent in catalytic function for crosslinking reaction of the crosslinkable functional group contained in the crosslinkable nylon. Therefore, when the crosslinked product of the crosslinkable nylon is produced in the presence of the sulfonic acid-based compound, crosslinking reaction of the crosslinkable functional group is more accelerated, and decomposition reaction of amide group is more easily suppressed.

Therefore, the surface layer containing at least one selected from the group including the paratoluenesulfonic acid, dinonylnaphthalenedisulfonic acid, and dodecylbenzenesulfonic acid as the sulfonic acid-based compound more easily becomes a surface layer containing the crosslinked product of the crosslinkable nylon, which is produced by accelerating crosslinking reaction of the crosslinkable functional group and suppressing decomposition reaction of amide group.

From the above, it is supposed that the resultant roll member still more suppresses the occurrence of a crack in the surface layer when continuously rotated in a state of being pressed against another body.

The content of the sulfonic acid-based compound relative to the mass of the whole of the surface layer is preferably 0.5% by mass or more and 5% by mass or less, more preferably 1% by mass or more and 4% by mass or less, and still more preferably 1.5% by mass or more and 3% by mass or less.

The surface layer preferably contains a conductive agent.

Examples of the conductive agent include an electronic conductive agent and an ionic conductive agent. Examples of the electronic conductive agent include powders of carbon black such as ketjen black, acetylene black, and the like; pyrolytic carbon, graphite; conductive metals or alloys such as aluminum, copper, nickel, stainless steel, and the like; conductive metal oxides such as tin oxide, indium oxide, titanium oxide, tin oxide-antimony oxide solid solution, tin oxide-indium oxide solid solution, and the like; an insulating material with a conductive-treated surface; and the like. Examples of the ionic conductive agent include perchlorates or chlorates of oniums such as tetraethyl ammonium, lauryl trimethyl ammonium, and the like; perchlorates or chlorates of alkali metals or alkaline-earth metals such as lithium, magnesium, and the like; and the like. These conductive agents may be used alone or in combination of two or more.

The conductive agent is preferably carbon black.

Examples of carbon black include ketjen black, acetylene black, oxidized carbon black with pH 5 or less, and the like. More specific examples thereof include "Special Black 350", "Special Black 100", "Special Black 250", "Special Black 5", "Special Black 4", "Special Black 4A", "Special Black 550", "Special Black 6", "Carbon Black FW200", "Carbon Black FW2", and "Carbon black FW2V", which are manufactured by Orion Engineered Carbons Inc., "MONARCH 880", "MONARCH 1000", "MONARCH 1300", "MONARCH 1400", "MOGUL-L", and "REGAL 400R", which are manufactured by Cabot Corporation, and the like.

The content of the conductive agent relative to the mass of the whole of the surface layer is preferably 4% by mass or more and 20% by mass or less, more preferably 6% by mass or more and 18% by mass or less, and still more preferably 8% by mass or more and 16% by mass or less.

—Crosslinking degree of surface layer—

In the roll member according to the exemplary embodiment, the crosslinking degree of the surface layer specified by formula (1) below is 0.3 or more and 0.7 or less. From the viewpoint of producing the roll member which more suppresses the occurrence of a crack in the surface layer when continuously rotated in a state of being pressed against another body, the crosslinking degree is preferably 0.35 or more and 0.65 or less and more preferably 0.4 or more and 0.6 or less.

$$\text{Crosslinking degree} = \text{absorbance at } 1078 \text{ cm}^{-1} \div \text{absorbance at } 2935 \text{ cm}^{-1} \quad \text{Formula (1):}$$

The crosslinking degree of the surface layer is calculated according to the following procedures.

A measurement sample having a thickness of 2 mm is cut out from the surface layer. Then, the measurement sample used as a measurement object is measured within a region containing wavelengths of 1078 cm$^{-1}$ and 2935 cm$^{-1}$ by using an infrared spectrophotometer (trade name NICOLET 6700 manufactured by Thermo Electron Corporation). The baseline correction is performed in an offset portion or the like with no absorbed light, and the absorbance at each of the wavelengths of 1078 cm$^{-1}$ and 2935 cm$^{-1}$ is determined. The crosslinking degree is calculated by substituting each of the absorbances in the formula (1).

—Thermal Degradation Index—

In the roll member according to the exemplary embodiment, the thermal degradation index of the surface layer specified by formula (2) below is 2.1 or more and 2.3 or less. From the viewpoint of producing the roll member which more suppresses the occurrence of a crack in the surface layer when continuously rotated in a state of being pressed against another body, the thermal degradation index is preferably 2.12 or more and 2.28 or less and more preferably 2.14 or more and 2.26 or less.

$$\text{Thermal degradation index} = \text{absorbance at } 1638 \text{ cm}^{-1} \div \text{absorbance at } 1543 \text{ cm}^{-1} \quad \text{Formula (2):}$$

The thermal degradation index of the surface layer is calculated according to the following procedures.

A measurement sample having a thickness of 2 mm is cut out from the surface layer. Then, the measurement sample used as a measurement object is measured within a region containing wavelengths of 1638 cm$^{-1}$ and 1543 cm$^{-1}$ by using an infrared spectrophotometer (trade name NICOLET 6700 manufactured by Thermo Electron Corporation). The baseline correction is performed in an offset portion or the like with no absorbed light, and the absorbance at each of the wavelengths of 1638 cm$^{-1}$ and 1543 cm$^{-1}$ is determined. The crosslinking degree is calculated by substituting each of the absorbances in the formula (2).

—Layer Thickness of Surface Layer—

The layer thickness of the surface layer is preferably 3 μm or more and 25 μm or less, more preferably 5 μm or more and 20 μm or less, and still more preferably 6 μm or more and 15 μm or less.

The layer thickness of the surface layer is measured by cutting the surface layer in the thickness direction and observing the resultant section by an optical microscope.

—Method for Forming Surface Layer—

An example of a method for forming the surface layer includes coating a surface layer-forming composition prepared by mixing the crosslinkable nylon, the sulfonic acid-based compound, and the conductive agent on the conductive elastic layer, drying the coating film formed by coating to form a dried film, and then firing the dried film.

The surface layer-forming composition containing the sulfonic acid-based compound accelerates the crosslinking reaction of the crosslinkable functional group contained in the crosslinkable nylon and easily suppresses the decomposition reaction of amide groups. Therefore, the roll member is easily produced, which suppresses the occurrence of a crack in the surface layer when continuously rotated in a state of being pressed against another body.

The content of the sulfonic acid-based compound in the surface layer-forming composition is preferably 1% by mass or more and 4% by mass or less relative to the content of the crosslinkable nylon.

In addition, the firing temperature of the dried film is preferably 100° C. or more and 200° C. or less. The firing time of the dried film is preferably 10 minutes or more and 180 minutes or less.

Usable examples of a method for coating the surface layer forming composition include usual method such as a roll coating method, a blade coating method, a wire bar coating method, a spray coating method, a dip coating method, a beads coating method, an air knife coating method, a curtain coating method, and the like.

(Conductive Substrate)

The roll member according to the exemplary embodiment may contain a conductive substrate.

The conductive substrate is a cylindrical or columnar conductive member, and the term "conductive" represents that volume resistivity is less than $10^{13}$ Ωcm.

Examples of the material of the substrate include metals such as iron (free-cutting steel or the like), copper, brass, stainless, aluminum, nickel, and the like. Examples of the substrate include a member (for example, a resin or ceramic member) having a plated outer peripheral surface, a member (for example, a resin or ceramic member) containing a conductive agent dispersed therein, and the like.

(Shape Etc. Of Roll Member)

The shape of the roll member according to the exemplary embodiment is not particularly limited, but is preferably a shape shown as an example in FIG. 1.

Figure 2:
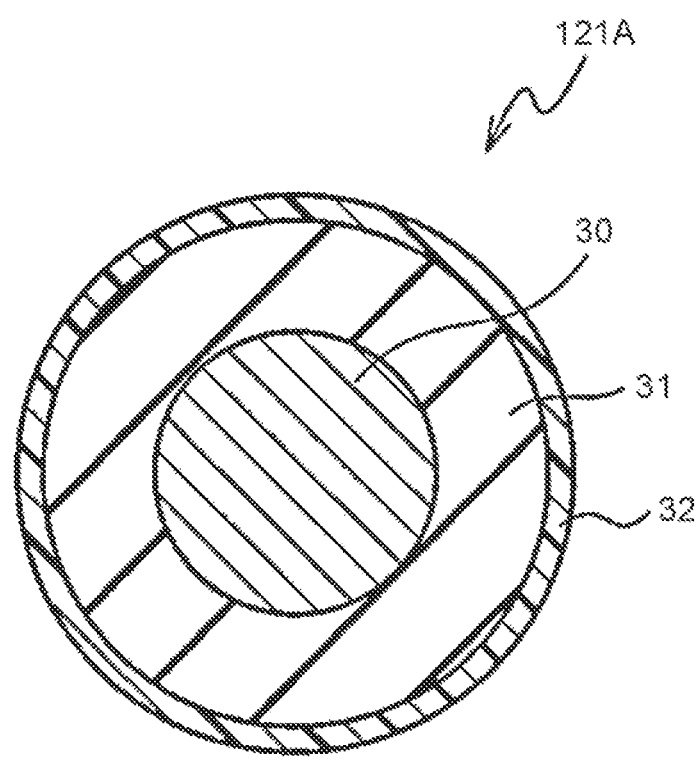
FIG. 2 is a schematic sectional view showing an example of a roll member according to an exemplary embodiment of the present disclosure and is a II-II sectional view of FIG. 1.

FIG. 1 is a schematic perspective view showing an example of the roll member according to the exemplary embodiment. FIG. 2 is a schematic sectional view showing an example of the roll member according to the exemplary embodiment. FIG. 2 is a II-II sectional view of FIG. 1.

As shown in FIG. 1 and FIG. 2, a roll member 121A according to the exemplary embodiment may include, for example, a shaft 30 (an example of the conductive substrate), a conductive elastic layer 31 disposed on the outer peripheral surface of the shaft 30, and a surface layer 32 disposed on the outer peripheral surface of the conductive elastic layer 31.

The roll member according to the exemplary embodiment may have a configuration including, for example, an adhesive layer (primer layer) disposed between the conductive substrate and the conductive elastic layer, a resistance-adjusting layer or migration-preventing layer disposed between the conductive elastic layer and the surface layer, and a coating layer (protective layer) disposed on the outside (outermost surface) of the surface layer.

(Application of Roll Member)

The roll member according to the exemplary embodiment is used for, for example, a charging roller (also referred to as a "charging member" hereinafter) which charges the surface of an image holding member in an electrophotographic copying machine, an electrostatic printer, or the like, a transfer roller which transfers a toner image formed on the image holding member to a transfer medium, a toner transport roller which transports a toner to the image holding member, a conductive roller which supplies power or drives by combination with a conductive belt which electrostatically transports paper, a cleaning roller which removes the toner on the image holding member, and the like. Also, the roll member is used for a power supply roller which charges an intermediate transfer body before ejection of an ink from an ink jet head in an ink jet system image forming apparatus, and the like.

<Charging Member, Charging Device, Image Forming Apparatus, and Process Cartridge>

A charging member according an exemplary embodiment of the present disclosure preferably includes the roll member according to the exemplary embodiment.

When the roll member according to the exemplary embodiment is used as the charging member according to the exemplary embodiment, durability of the charging member is improved, and the occurrence of an image defect due to a crack in the surface layer is suppressed even during long-term use.

A charging device according to an exemplary embodiment of the present disclosure includes the charging member according to the exemplary embodiment.

The charging device according to the exemplary embodiment is preferably a charging member which includes the charging member according to the exemplary embodiment and which charges an image holding member by a contact charging system.

The contact width with the image holding member in the circumferential direction of the charging member (that is, the width in the circumferential direction of the charging member in a region where the image holding member is in contact with the charging member) is not particularly limited, but is, for example, within a range of 0.5 mm or more and 5 mm or less and is preferably within a range of 1 mm or more and 3 mm or less.

A process cartridge according to an exemplary embodiment of the present disclosure includes, for example, a charging member which charges the surface of an image holding member and is detachable from an image forming apparatus having a configuration described below. The charging device according to the exemplary embodiment is applied to the charging member.

If required, the process cartridge according to the exemplary embodiment may include, for example, at least one selected from the group including an electrostatic latent image forming device which forms an electrostatic latent image on the charged surface of an image holding member, a developing device which develops the latent image formed on the image holding member with a toner to form a toner image, a transfer device which transfers the toner image formed on the surface of the image holding member to a recording medium, and a cleaning device which cleans the surface of the image holding member.

An image forming apparatus according to an exemplary embodiment of the present disclosure includes an image holding member, a charging device which charges the surface of the image holding member, an electrostatic latent image forming device which forms an electrostatic latent image on the charged surface of the image holding member, a developing device which develops the electrostatic latent image formed on the surface of the image holding member by a developer containing a toner to form a toner image, and a transfer device which transfers the toner image to the surface of a recording medium. The charging device according to the exemplary embodiment is applied to the charging device.

Next, the image forming apparatus and process cartridge according to the exemplary embodiment are described with reference to the drawings.

Figure 3:
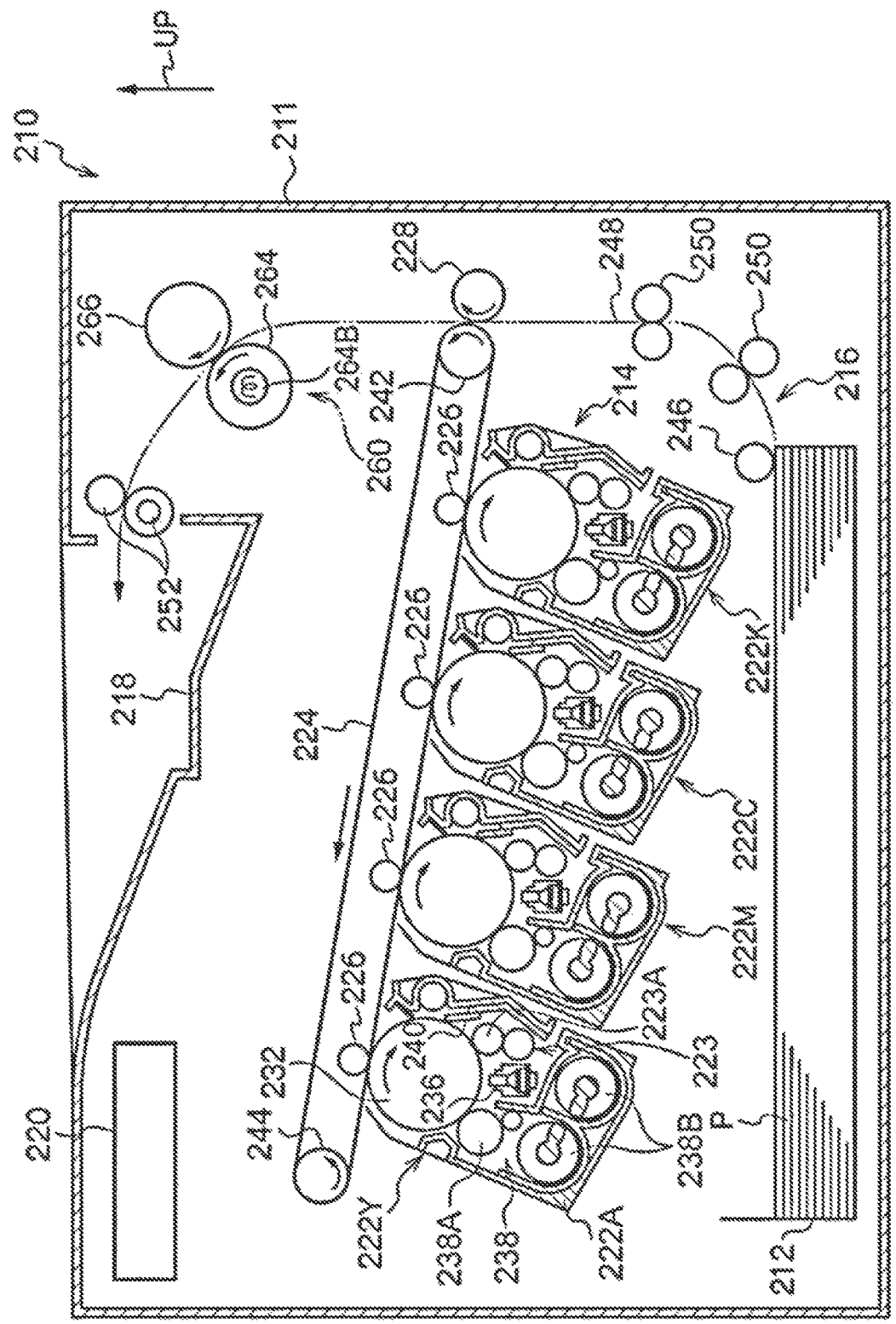
FIG. 3 is a schematic configuration diagram showing an example of an image forming apparatus according to an exemplary embodiment of the present disclosure.

FIG. 3 is a schematic configuration drawing showing the image forming apparatus according to the exemplary embodiment. In the drawing, an arrow UP indicates the upper portion in the vertical direction.

As shown in FIG. 3, an image forming apparatus 210 includes an image forming apparatus body 211 which houses constituent components therein. In the image forming apparatus body 211, provided are a housing part 212 which houses a recording medium P such as paper, an image forming part 214 which forms an image on the recording medium P, a transport part 216 which transports the recording medium P from the housing part 212 to the image forming part 214, and a controller 220 which controls the operation of each of the parts of the image forming apparatus 210. In addition, an upper portion of the image forming apparatus body 211 is provided with a discharge part 218, to which the recording medium P having the image formed thereon by the Image forming part 214 is discharged.

The image forming part 214 includes image forming units 222Y, 222M, 222C, and 222K (shown as "222Y to 222k" hereinafter) which form toner images of colors of yellow (Y), magenta (M), cyan (C), and black (K), respectively, an intermediate transfer belt 224 (an examples of a transfer object) to which the toner images formed by the image forming units 222Y to 222K are transferred, first transfer rollers 226 (an example of a transfer roller) which transfer the toner images formed by the image forming units 222Y to 222K to the intermediate transfer belt 224, and a second transfer roller 228 (an example of a transfer member) which transfers the toner images transferred to the intermediate transfer belt 224 by the first transfer rollers 226 from the intermediate transfer belt 224 to the recording medium P. The image forming part 214 is not limited to the configuration described above and may have any other configuration as long as it forms an image on the recording medium P (an example of a transfer material).

Herein, a unit including the intermediate transfer belt 224, the first transfer rollers 226, and the second transfer roller 228 corresponds to an example of a transfer device. The unit may be formed as a cartridge (process cartridge).

The image forming units 222Y to 222K are arranged in a state inclined with respect to the horizontal direction at a central portion in the vertical direction of the image forming apparatus 210. Also, each of the image forming units 222Y to 222K has a photoreceptor 232 (an example of an image holding member) which is rotated in a direction (for example, the clockwise direction in FIG. 3). In addition, the image forming units 222Y to 222K have the same configuration, and thus the reference numerals of the parts of the image forming units 222M, 222C, and 222K are omitted in FIG. 3.

There are provided, around each of the photoreceptors 232 in order from the upstream side in the rotational direction of the photoreceptor 232, a charging device 223 having a charging roller 223A (an example of a charging member) which charges the photoreceptor 232, an exposure device 236 (an example of an electrostatic latent image forming device) which exposes to light the photoreceptor 232 charged by the charging device 223 to form an electrostatic latent image on the photoreceptor 232, a developing device 238 which develops the latent image formed on the photoreceptor 232 by the exposure device 236 to form a toner image, and a removing member (a cleaning blade or the like) 240 which comes in contact with the photoreceptor 232 and removes the toner remaining on the photoreceptor 232.

The photoreceptor 232, the charging device 223, the exposure device 236, the developing device 238, and the removing member 240 are integrally held by the housing 222A to form a cartridge (process cartridge).

A self-scanning LED print head is applied as the exposure device 236. The exposure device 236 may be an exposure derive of an optical system which exposures the photoreceptor 232 to light from a light source through a polygon mirror.

The exposure device 236 is adapted to form an image based on an image signal sent from the controller 220. Examples of the image signal sent from the controller 220 include an image signal acquired by the controller 220 from an outer apparatus.

The developing device 238 is provided with a developer supply member 238A which supplies the developer to the photoreceptor 232 and a plural transport members 238B which transport while stirring the developer applied to the developer supply member 238A.

The intermediate transfer belt 224 is formed in an annular shape and is disposed above the image forming units 222Y to 222K. In addition, winding rollers 242 and 244 on which the intermediate transfer belt 224 is wound are provided on the inner peripheral side of the intermediate transfer belt 224. When either of the winding rollers 242 and 244 is rotationally driven, the intermediate transfer belt 224 is circularly moved (rotated) in a direction (for example. the counterclockwise direction in FIG. 3) while being in contact with the photoreceptors 232. The winding roller 242 serves as a counter roller facing the second transfer roller 228.

Each of the first transfer rollers 226 faces the photoreceptor 232 with the intermediate transfer belt 224 held therebetween. The position between each of the first transfer rollers 226 and the photoreceptor 232 serves as a first transfer position where the toner image formed on the photoreceptor 232 is transferred to the intermediate transfer belt 224.

The second transfer roller 228 faces the winding roller 242 with the intermediate transfer belt 224 held therebetween. The position between the second transfer roller 228 and the winding roller 242 serves as a second transfer position where the toner image transferred to the intermediate transfer belt 224 is transferred to the recording medium P.

The transport part 216 includes a delivery roller 246 which delivers the recording medium P housed in the housing part 212, a transport path 248 through which the recording medium P delivered by the delivery roller 246 is transported, and plural transport rollers 250 which are disposed along the transport path 248 and transport the recording medium P delivered by the delivery roller 246 to the second transfer position.

In addition, a fixing device 260 which fixes the toner image formed on the recording medium P by the image forming part 214 to the recording medium P is provided downstream the second transport position in the transport direction.

The fixing device 260 is provided with a heating roller 264 which heats an image on the recording medium P and a pressure roller 266 as an example of a pressure member. A heating source 264B is provided in the heating roller 264.

A discharger roller 252 which discharges the recording medium P with the toner image fixed thereto to the discharge part 218 is provided downstream the fixing device 260 in the transport direction.

Next, an image forming operation of forming an image on the recording medium P in the image forming device 210 is described.

In the image forming device 210, the recording medium P delivered from the housing part 212 by the delivery roller 246 is sent to the second transfer position by the plural transport rollers 250.

On the other hand, in each of the image forming units 222Y to 222K, the photoreceptor 232 charged by the charging device 223 is exposure to light by the exposure device 236 to form a latent image on the photoreceptor 232. Then, a toner image is formed on the photoreceptor 232 by development of the latent image by the developing device 238. The toner images of colors formed in the image forming units 222Y to 222K are superposed on the intermediate transfer belt 224 at the respective first transfer positions, thereby forming a color image. Then, the color image formed on the intermediate transfer belt 224 is transferred to the recording medium P at the second transfer position.

The recording medium P to which the color image has been transferred is transported to the fixing device 260 and the transferred toner image is fixed by the fixing device 260. The recording medium P with the toner image fixed thereto is discharged to the discharge part 218 by the discharge roller 252. As described above, a series of image forming operations is performed.

The image forming apparatus 210 according to the exemplary embodiment is not limited to the configuration described above, and, for example, a known image forming apparatus such as a direct transfer-system image forming apparatus or the like may be used, in which the toner images formed on the photoreceptors 232 of the respective image forming units 222Y to 222K are transferred directly to the recording medium P.

EXAMPLES

Examples are described below, but the present disclosure is not limited to these examples. In the description below, "parts" and "%" are all on mass basis unless otherwise specified.

Example 1: Formation of Roll Member (Formation of Conductive Elastic Layer)

A composition for forming a conductive elastic layer is prepared by kneading, with an open roll, a mixture prepared by adding, to 100 parts by mass of an elastic material (epichlorohydrin-ethylene oxide-allyl glycidyl ether copolymer rubber), 15 parts by mass of a conductive agent (carbon black, Asahi Thermal manufactured by Asahi Carbon Co., Ltd.), 1 part by mass of a vulcanizing agent (sulfur, 200 mesh, manufactured by Tsurumi Chemical Industry Co., Ltd.) as another additive mixed in a conductive elastic layer, and 2.0 parts by mass of a vulcanization accelerator (NOCCELER DM manufactured by Ouchi Shinko Chemical Industrial Co., Ltd.) as another additive mixed in a conductive elastic layer. The composition for forming a conductive elastic layer is wound, through an adhesive layer, on the outer peripheral surface of a shaft (substrate) made of SUS303 as a material and having a diameter of 8 mm by using a press molding machine, placed in a furnace at a temperature of 180° C. and heated for 30 minutes, forming a conductive elastic layer having a layer thickness of 2.5 mm on the shaft. The outer peripheral surface of the conductive elastic layer is polished to form a conductive elastic roll having a diameter of 12 mm and a conductive elastic layer with a layer thickness of 2.0 mm.

(Formation of Surface Layer)

To 100 parts by mass of a first resin solution prepared by dissolving 8 parts by mass of crosslinkable nylon RE1 (methoxymethylated nylon, FR-101 manufactured by Namariichi Co., Ltd.) as a resin in 92 parts by mass of a mixed solvent of methanol and 1-butanol (methanol: 1-butanol=3:1 by mass ratio), 8 parts by mass of carbon black (MONARCH 880 manufactured by Cabot Corporation) is added and stirred for 30 minutes, preparing a second resin solution. The resultant second resin solution is mixed with 0.32 parts by mass (the amount such that the catalyst amount is 4 parts relative to 100 parts of crosslinkable nylon) of sulfonic acid-based compound CAT1 (paratoluenesulfonic acid amine salt) as a catalyst and then dispersed by using a beads mill, preparing a dispersion.

The temperature of the dispersion is adjusted to 18.5° C., and the dispersion is dip-coated on the outer peripheral surface of the conductive elastic roll under an environment temperature of 21° C., and dried by maintaining at the same temperature.

Then, the resultant roll is fired by heating at a temperature of 100° C. for a time of 30 minutes to form a surface layer having a thickness of 10 μm, thereby producing a roll member.

Examples 2 to 9 and Comparative Examples 1 to 5

A roll member is produced by the same procedures as in Example 1 except that in forming the surface layer, the type of the resin, the type of the catalyst, the amount of the catalyst added relative to 100 parts of the resin, the firing temperature, and the firing time are as shown in Table 1.

The details of resin and catalyst described in Table 1 are as follows.
—Resin—
  RE1: methoxymethylated nylon, FR-101 manufactured by Namariichi Co., Ltd., crosslinkable functional group: methoxymethyl group
—Catalyst—
  CAT1: amine salt of paratoluenesulfonic acid, Kusumoto Chemicals, Ltd. NACURE 2500
  CAT2: amine salt of dinonylnaphthalenedisulfonic acid, Kusumoto Chemicals, Ltd. NACURE 1557
  CAT3: amine salt of dodecylbenzenesulfonic acid, Kusumoto Chemicals, Ltd. NACURE 5225
  CAT4: amine salt of alkylphosphoric acid, Kusumoto Chemicals, Ltd. NACURE 4167
  CAT5: paratoluenesulfonic acid, Kusumoto Chemicals, Ltd. K-CURE 1040
  CAT6: dinonylnaphthalenedisulfonic acid, Kusumoto Chemicals, Ltd. NACURE1051
  CAT7: dodecylbenzenesulfonic acid, Kusumoto Chemicals, Ltd. NACURE 5076
<Evaluation>
(MIT Test)

A Teflon (registered trade name) sheet is attached to a surface of a metal plate, and the dispersion prepared for forming the surface layer is coated on the Teflon (registered trade name) sheet by using a bar coater to form a coating film having a thickness of 500 μm. The coating film is fired to form a test piece of 150 mm in length, 10 mm in width, and 50 μm in thickness.

By using the test piece, the number of times of folding endurance is measured when only the curvature radius of a holding clamp is changed from 0.05 mm to 0.2 mm by a method according to JIS-P8115 (2001) using a MIT tester (manufactured by Ueshima Seisakusho Co., Ltd.).

Next, a SN chart is formed, in which the abscissa is the number of times of holding endurance, and the ordinate is stress. The stress is a value (stress=bending stress+load stress) obtained by adding up the bending stress and load stress determined by formulae below.

Bending stress: {(film thickness+tip $R$)/(film thickness/2+tip $R$)−1}×tensile elastic modulus Load stress: load/(film thickness×width)

Next, in the resultant SN chart, the "number of times of folding endurance at the stress of 1 Pa" is determined. The obtained results are shown in Table 2. In the table, "M" represents "×10$^6$".

(Evaluation of Actual-Machine Running Resistance)

The roll member produced in each of the examples and the comparative examples is incorporated as a charging roller into a modified machine of an image forming apparatus (DocuCentre-V C7776, manufactured by Fujifilm Business Innovation Corp.), and an A4 halftone image with an area coverage of 30% is continuously output.

The crack in the surface of the charging roller is appropriately observed with an optical microscope VK (manufactured by Keyence Corporation), and when a crack with a width of 10 μm or more is observed, the number of rotations of the photoreceptor (diameter of the photoreceptor: 30 mm) is recorded.

The results of the number of rotations of the photoreceptor are shown in Table 2.

TABLE 1

| | Resin | | Catalyst | | Adding amount parts (relative to 100 parts of resin) | Heating temperature ° C. | Heating time Minutes |
|---|---|---|---|---|---|---|---|
| | Type | Compound name | Type | Compound name | | | |
| Example 1 | RE1 | Methoxymethylated nylon | CAT1 | Paratoluenesulfonic acid amine salt | 4 | 100 | 30 |
| Example 2 | RE1 | Methoxymethylated nylon | CAT1 | Paratoluenesulfonic acid amine salt | 1 | 100 | 30 |
| Example 3 | RE1 | Methoxymethylated nylon | CAT1 | Paratoluenesulfonic acid amine salt | 0.5 | 100 | 30 |
| Example 4 | RE1 | Methoxymethylated nylon | CAT1 | Paratoluenesulfonic acid amine salt | 0.1 | 100 | 30 |
| Comparative Example 1 | RE1 | Methoxymethylated nylon | CAT1 | Paratoluenesulfonic acid amine salt | 1 | 100 | 90 |
| Comparative Example 2 | RE1 | Methoxymethylated nylon | CAT1 | Paratoluenesulfonic acid amine salt | 1 | 100 | 60 |
| Comparative Example 3 | RE1 | Methoxymethylated nylon | CAT1 | Paratoluenesulfonic acid amine salt | 1 | 100 | 20 |
| Comparative Example 4 | RE1 | Methoxymethylated nylon | CAT1 | Paratoluenesulfonic acid amine salt | 1 | 100 | 10 |
| Example 5 | RE1 | Methoxymethylated nylon | CAT5 | Paratoluenesulfonic acid | 1 | 100 | 30 |
| Example 6 | RE1 | Methoxymethylated nylon | CAT2 | Dinonylnaphthalenedisulfonic acid amine salt | 1 | 100 | 30 |
| Example 7 | RE1 | Methoxymethylated nylon | CAT6 | Dinonylnaphthalenedisulfonic acid | 1 | 100 | 30 |
| Example 8 | RE1 | Methoxymethylated nylon | CAT3 | Dodecylbenzenesulfonic acid amine salt | 1 | 100 | 30 |
| Example 9 | RE1 | Methoxymethylated nylon | CAT7 | Dodecylbenzenesulfonic acid | 1 | 100 | 30 |
| Comparative Example 5 | RE1 | Methoxymethylated nylon | CAT4 | Alkylphosphoric acid amine salt | 1 | 145 | 30 |

TABLE 2

| | Composition of surface layer | | Crosslinking degree | Thermal index degradation | MIT test (Number of times) | Evaluation of actual-machine running resistance (Number of times) |
|---|---|---|---|---|---|---|
| | Resin | Catalyst | | | | |
| Example 1 | Crosslinked product of methoxymethylated nylon | Paratoluenesulfonic acid amine salt | 0.3 | 2.20 | 16.0M | 7.0M |
| Example 2 | Crosslinked product of methoxymethylated nylon | Paratoluenesulfonic acid amine salt | 0.7 | 2.20 | 15.0M | 9.0M |
| Example 3 | Crosslinked product of methoxymethylated nylon | Paratoluenesulfonic acid amine salt | 0.5 | 2.10 | 19.0M | 7.0M |
| Example 4 | Crosslinked product of methoxymethylated nylon | Paratoluenesulfonic acid amine salt | 0.5 | 2.30 | 13.0M | 7.0M |
| Comparative Example 1 | Crosslinked product of methoxymethylated nylon | Paratoluenesulfonic acid amine salt | 0.2 | 2.20 | 2.0M | 1.0M |
| Comparative Example 2 | Crosslinked product of methoxymethylated nylon | Paratoluenesulfonic acid amine salt | 0.8 | 2.20 | 3.0M | 1.5M |
| Comparative Example 3 | Crosslinked product of methoxymethylated nylon | Paratoluenesulfonic acid amine salt | 0.5 | 2.00 | 1.0M | 2.0M |
| Comparative Example 4 | Crosslinked product of methoxymethylated nylon | Paratoluenesulfonic acid amine salt | 0.5 | 2.40 | 2.5M | 1.5M |
| Example 5 | Crosslinked product of methoxymethylated nylon | Paratoluenesulfonic acid | 0.5 | 2.20 | 15.0M | 7.0M |
| Example 6 | Crosslinked product of methoxymethylated nylon | Dinonylnaphthalenedisulfonic acid amine salt | 0.4 | 2.15 | 14.0M | 6.0M |
| Example 7 | Crosslinked product of methoxymethylated nylon | Dinonylnaphthalenedisulfonic acid | 0.3 | 2.20 | 8.0M | 5.5M |
| Example 8 | Crosslinked product of methoxymethylated nylon | Dodecylbenzenesulfonic acid amine salt | 0.6 | 2.25 | 18.0M | 10.0M |
| Example 9 | Crosslinked product of methoxymethylated nylon | Dodecylbenzenesulfonic acid | 0.5 | 2.25 | 7.0M | 5.0M |
| Comparative Example 5 | Crosslinked product of methoxymethylated nylon | Alkylphosphoric acid amine salt | 0.5 | 1.90 | 4.0M | 3.0M |

The above results indicate that the roll members of the examples are roll members which suppress the occurrence of a crack in the surface layer when continuously rotated in a state of being pressed against another body.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A roll member comprising:
a conductive elastic layer; and
a surface layer provided on the conductive elastic layer, wherein:
the surface layer contains a crosslinked product of crosslinkable nylon;
the crosslinking degree of the surface layer specified by formula (1) below is 0.3 or more and 0.7 or less; and
the thermal degradation index of the surface layer specified by formula (2) below is 2.1 or more and 2.3 or less, Crosslinking degree=absorbance at 1078 cm$^{-1}$÷absorbance at 2935 cm$^{-1}$   Formula (1)

Thermal degradation index=absorbance at 1638 cm$^{-1}$÷absorbance at 1543 cm$^{-1}$.   Formula (2).

2. The roll member according to claim 1, wherein the crosslinking degree is 0.35 or more and 0.65 or less.

3. The roll member according to claim 1, wherein the thermal degradation index is 2.12 or more and 2.28 or less.

4. The roll member according to claim 1, wherein the surface layer contains a sulfonic acid-based compound.

5. The roll member according to claim 4, wherein the sulfonic acid-based compound is at least one selected from the group consisting of paratoluenesulfonic acid, a paratoluenesulfonate salt, dinonylnaphthalenedisulfonic acid, a dinonylnaphthalenedisulfonate salt, dodecylbenzenesulfonic acid, and a dodecylbenzenesulfonate salt.

6. The roll member according to claim 4, wherein the content of the sulfonic acid-based compound is 0.5% by mass or more and 5% by mass or less relative to the mass of the whole of the surface layer.

7. The roll member according to claim 4, wherein the content of the sulfonic acid-based compound is 1% by mass or more and 4% by mass or less relative to the crosslinkable nylon.

8. The roll member according to claim 1, wherein the crosslinkable nylon is methoxymethylated nylon.

9. A charging member comprising the roll member according to claim 1.

10. A charging device comprising the charging member according to claim 9.

11. A process cartridge attachable to and detachable from an image forming apparatus, the process cartridge comprising the charging device according to claim 10.

12. An image forming apparatus comprising:
an image holding member;
the charging device according to claim 10 that charges the surface of the image holding member;
an electrostatic latent image forming device that forms an electrostatic latent image on the charged surface of the image holding member;
a developing device that develops the electrostatic latent image formed on the surface of the image holding member with a developer containing a toner to form a toner image; and
a transfer device that transfers the toner image to the surface of a recording medium.

* * * * *